US008672673B2

(12) United States Patent
Noman et al.

(10) Patent No.: US 8,672,673 B2
(45) Date of Patent: Mar. 18, 2014

(54) SELF-LOCATING NITROGEN OXIDE REDUCTION BAFFLE FOR FURNACE AND GAS FURNACE INCORPORATING THE SAME

(75) Inventors: Shiblee S. M. Noman, Carrollton, TX (US); Jesse Sanchez, Jr., Mansfield, TX (US); John W. Whitesitt, Garland, TX (US)

(73) Assignee: Lennox Industries, Inc., Richardson, TX (US)

( * ) Notice: Subject to any disclaimer, the term of this patent is extended or adjusted under 35 U.S.C. 154(b) by 918 days.

(21) Appl. No.: 12/834,643

(22) Filed: Jul. 12, 2010

(65) Prior Publication Data
US 2011/0174300 A1 Jul. 21, 2011

Related U.S. Application Data (60) Provisional application No. 61/295,501, filed on Jan. 15, 2010.

(51) Int. Cl.
*F23M 9/06* (2006.01)

(52) U.S. Cl.
USPC ............................ 431/172; 431/171; 431/248

(58) Field of Classification Search
USPC .................................. 431/171, 172, 248, 352
See application file for complete search history.

(56) References Cited

U.S. PATENT DOCUMENTS

| 98,496 | A | | 1/1870 | Honsinger | |
|---|---|---|---|---|---|
| 4,619,604 | A | * | 10/1986 | Pickering | 431/353 |
| 4,776,320 | A | * | 10/1988 | Ripka et al. | 431/353 |
| 4,904,179 | A | * | 2/1990 | Drago et al. | 431/347 |
| 5,370,529 | A | * | 12/1994 | Lu et al. | 431/353 |
| 5,472,339 | A | * | 12/1995 | Rakowski et al. | 431/171 |
| 5,596,979 | A | * | 1/1997 | Sobotka et al. | 431/347 |

\* cited by examiner

*Primary Examiner* — Craig Schneider
*Assistant Examiner* — Craig J Price (57) ABSTRACT

A nitrogen oxide reduction baffle for a heat exchanger of a furnace and a gas furnace incorporating at least one such baffle. In one embodiment, the baffle includes: (1) a body having a predetermined length, cross-sectional configuration and longitudinal slot, the longitudinal slot having a predetermined width and position and (2) a locating structure coupled to the body and configured to place the body in a predetermined longitudinal location within a heat exchanger and orient the slot relative to the heat exchanger, the body laterally constrained within the heat exchanger when the body is located at the predetermined longitudinal location.

20 Claims, 13 Drawing Sheets

SELF-LOCATING NITROGEN OXIDE REDUCTION BAFFLE FOR FURNACE AND GAS FURNACE INCORPORATING THE SAME

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference.

TECHNICAL FIELD

This application is directed, in general, to heating, ventilation and air conditioning (HVAC) systems and, more specifically, to a self-locating nitrogen oxide ($NO_x$) baffle for a furnace and a gas furnace incorporating at least one of such baffle.

BACKGROUND

Combustion heaters of conventional heating systems, also called furnaces, often employ tubular combustion chambers, also called heat exchangers, wherein a mixture of gaseous fuel and air is burned, and the combustion products resulting from the burning are directed to a flue and ultimately to an exhaust. Air to be conditioned is usually returned from a living/working space and passed over the tubular combustion chambers, where it takes on heat from the combustion chambers and then is routed back to a living or working space. As a result of the combustion process, combustion systems normally generate gaseous combustion products, including $NO_x$, which are vented to the atmosphere as flue gas. It is desirable to limit these $NO_x$ emissions since NOx is considered a pollutant, and combustion systems sold in certain jurisdictions must meet strict $NO_x$ emission standards.

One technique for limiting $NO_x$ emissions from a combustion system is to control peak combustion flame temperatures that contact the tubular combustion chambers as well as limiting the residence times at the peak temperatures to minimize the formation of $NO_x$. It has been known that peak combustion flame temperatures can be controlled by locating a flame holder, also called a baffle, into the combustion tube to contain the flame at least partially and discourage it from directly contacting the combustion tube. Baffles have been in wide use for many years in commercial and residential furnaces.

SUMMARY

One aspect provides a $NO_x$ reduction baffle for a heat exchanger of a furnace. In one embodiment, the baffle includes: (1) a body having a predetermined length, cross-sectional configuration and longitudinal slot, the longitudinal slot having a predetermined width and position and (2) a locating structure coupled to the body and configured to place the body in a predetermined longitudinal location within a heat exchanger and orient the slot relative to the heat exchanger, the body laterally constrained within the heat exchanger when the body is located at the predetermined longitudinal location.

Another aspect provides a gas furnace. In one embodiment, the furnace includes: (1) a housing, (2) a solenoid valve located in the housing, (3) a manifold coupled to the valve, (4) at least one gas orifice coupled to the manifold, (5) at least one corresponding heat exchanger located proximate the at least one gas orifice, (6) a baffle, having: (6a) a body having a predetermined length, cross-sectional configuration and longitudinal slot, the longitudinal slot having a predetermined width and position and (6b) a locating structure coupled to the body and configured to place the body in a predetermined longitudinal location within a heat exchanger and orient the slot relative to the heat exchanger, the body laterally constrained within the heat exchanger and (7) a blower located in the housing proximate the at least one heat exchanger.

BRIEF DESCRIPTION

Reference is now made to the following descriptions taken in conjunction with the accompanying drawings, in which.

DETAILED DESCRIPTION

Described herein are various embodiments of a self-locating $NO_x$ reduction baffle that may be employed in a furnace. The baffle is designed to be placed within a heat exchanger, typically proximate an inlet thereof, where it receives and processes a flame and controls its dynamics such that concentrations of $NO_x$ and perhaps other combustion products are brought to within desired limits. In various embodiments, $NO_x$ is maintained below 40 nanograms per Joule (ng/J). In other embodiments, NOx production is maintained substantially below 40 ng/J. In related embodiments, carbon monoxide (CO) is also maintained below 35 parts per million (ppm). In other embodiments, CO production is maintained below 9 ppm.

In general, the baffle moderates the temperature of the flame as it travels along its length. Moderating the temperature of the flame includes decreasing maximum temperatures and increasing minimum temperatures. Decreasing high temperatures reduces $NO_x$ production, and increasing low temperatures reduces CO production. The length and cross-sectional configuration of the baffle, the width and position of any longitudinal slot thereof, the material out of which the baffle is constructed and the location and orientation of the baffle relative to the heat exchanger potentially affect the manner in which the baffle processes the flame traveling along its length.

To address at least some of these objectives and perhaps others, various baffle embodiments to be introduced herein employ a body having a predetermined length and cross-sectional configuration and a longitudinal slot of a predetermined width and position such that the flame is processed in a desired manner. A locating structure is coupled to the body and configured to place the body in a predetermined longitudinal location within a heat exchanger. The locating structure is further configured to orient the slot relative to the heat exchanger. In some embodiments, the cross-sectional configuration of the body is also configured such that when the body is located at its desired position with the heat exchanger, it is laterally constrained therein. These embodiments may properly be regarded as "self-locating" baffles. Certain of the baffle embodiments include a further structure that extends from the body at an end thereof that is distal from the locating structure. In some embodiments, the further structure is configured to locate the body laterally relative to the heat exchanger when it is located at its desired position therein. These embodiments may also properly be regarded as self-locating baffles. In other embodiments, the further structure is configured to provide a reactive surface adapted to create a reaction with respect to a combustion product (e.g., CO). In a specific embodiment, the reactive surface is adapted to cause CO to be converted into $CO_2$, which is generally regarded as being less harmful than CO.

Figure 1:
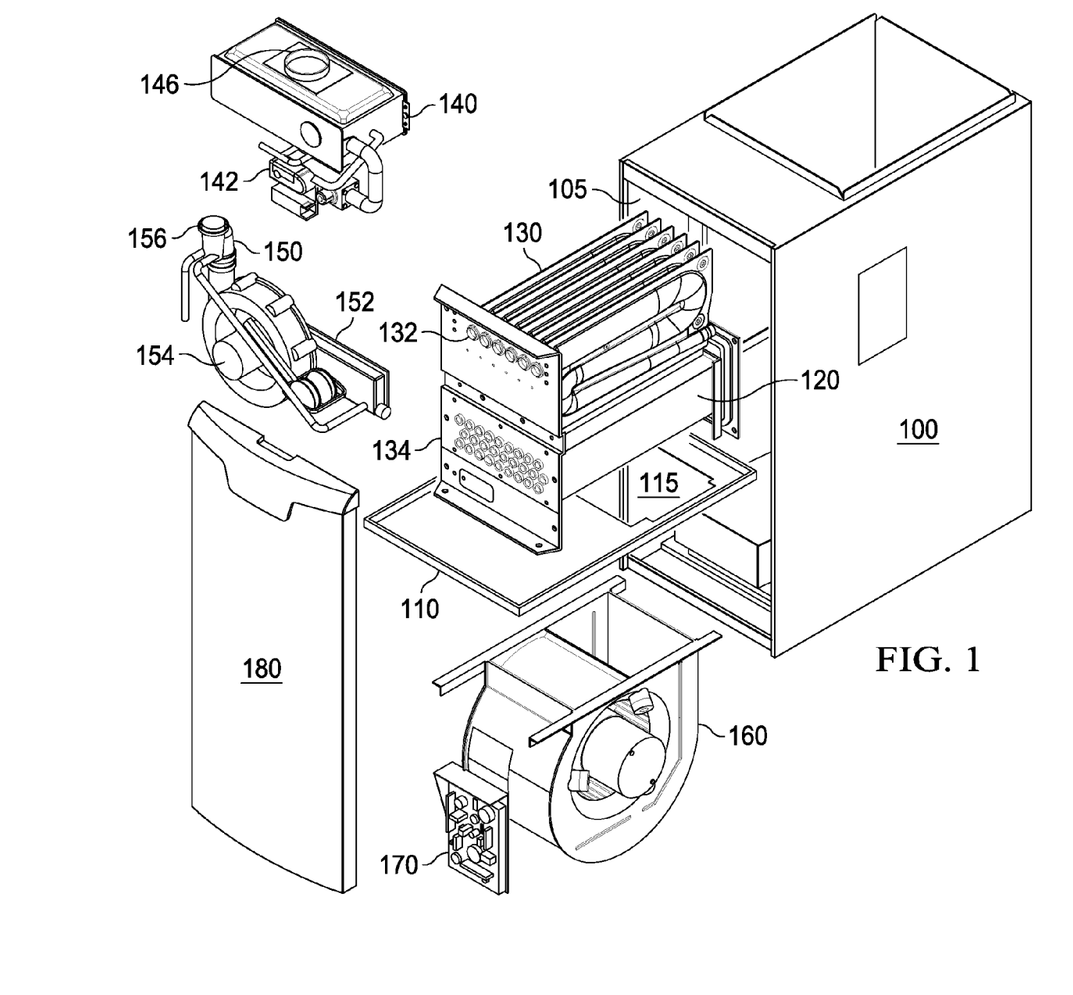
FIG. 1 is an exploded isometric view of a portion of one embodiment of a furnace within which a self-locating $NO_x$ reduction baffle constructed according to the principles of the invention may be employed.

FIG. 1 is an exploded isometric view of a portion of one embodiment of a furnace within which a self-locating $NO_x$ reduction baffle constructed according to the principles of the invention may be employed. The furnace includes a housing 100 having a front opening 105 within which a mounting shelf 110 is located. The mounting shelf 110 has an opening 115 therein and supports a heat exchanger assembly 120 over the opening 115. The illustrated embodiment of the heat exchanger assembly 120 has a row of six heat exchangers (one referenced as 130) coupled to one another. Alternative embodiments of the heat exchanger assembly 120 have more or fewer heat exchangers coupled to one another in one or more rows. In the illustrated embodiment, the heat exchangers are generally serpentine and have three approximately 180° folds such that the heat exchangers cross over the opening 115 four times, terminating in inlets 132 and outlets 134 that are generally mutually coplanar and oriented toward the opening 105 of the housing 100. Alternative embodiments have alternative heat exchanger configurations.

A burner assembly 140 contains a thermostatically-controlled solenoid valve 142, a manifold 144 leading from the valve 142 and across the burner assembly 140, one or more gas orifices (not shown) coupled to the manifold 144 and one or more burners (not shown) corresponding to and located proximate the gas orifices. The illustrated embodiment of the burner assembly 140 has a row of six burners. Alternative embodiments of the burner assembly 140 have more or fewer burners arranged in one or more rows. A flue 146 allows undesired gases (e.g., unburned fuel) to be vented from the burner assembly 140. In an assembled configuration, the burner assembly 140 is located proximate the heat exchanger assembly 120 such that the burners thereof at least approximately align with the inlets 132.

A draft inducer assembly 150 contains a manifold 152, a draft inducing exhaust fan 154 having an inlet coupled to the manifold 152 and a flue 156 coupled to an outlet of the exhaust fan 154. In an assembled configuration, the draft inducer assembly 150 is located proximate the heat exchanger assembly 120 such that the manifold 152 thereof at least approximately align with the outlets 134 and the flue 156 at least approximately aligns with the flue 146 of the burner assembly 140.

A blower 160 is suspended from the shelf 110 such that an outlet (not referenced) thereof approximately aligns with the opening 115. An electronic controller 170 is located proximate the blower 160 and, in the illustrated embodiment, controls the blower, the valve 142 and the exhaust fan 154 to cause the furnace to provide heat. A cover 180 may be placed over the front opening 105 of the housing 100.

In the illustrated embodiment, the controller 170 turns on the exhaust fan to initiate a draft in the heat exchangers (including the heat exchanger 130) and purge potentially harmful unburned gases or gaseous combustion products. Then the controller 170 opens the valve 142 to admit gas to the manifold 144 and the one or more gas orifices, whereupon the gas begins to mix with air to form primary combustion air. Then the controller 170 activates an igniter (not shown in FIG. 1) to attempt to ignite the primary combustion air. If the output of a thermocouple indicates that the primary combustion air has not ignited within a predetermined period of time, the controller 170 then closes the valve 142 and waits until attempting to start again. If the output of a thermocouple indicates that the primary combustion air has ignited within the predetermined period of time, the controller 170 then activates the blower, which forces air upward through the opening 115 and the heat exchanger assembly 120. As it passes over the surfaces of the heat exchangers, the air is warmed, whereupon it may be delivered or distributed as needed to provide heating.

Figure 2:
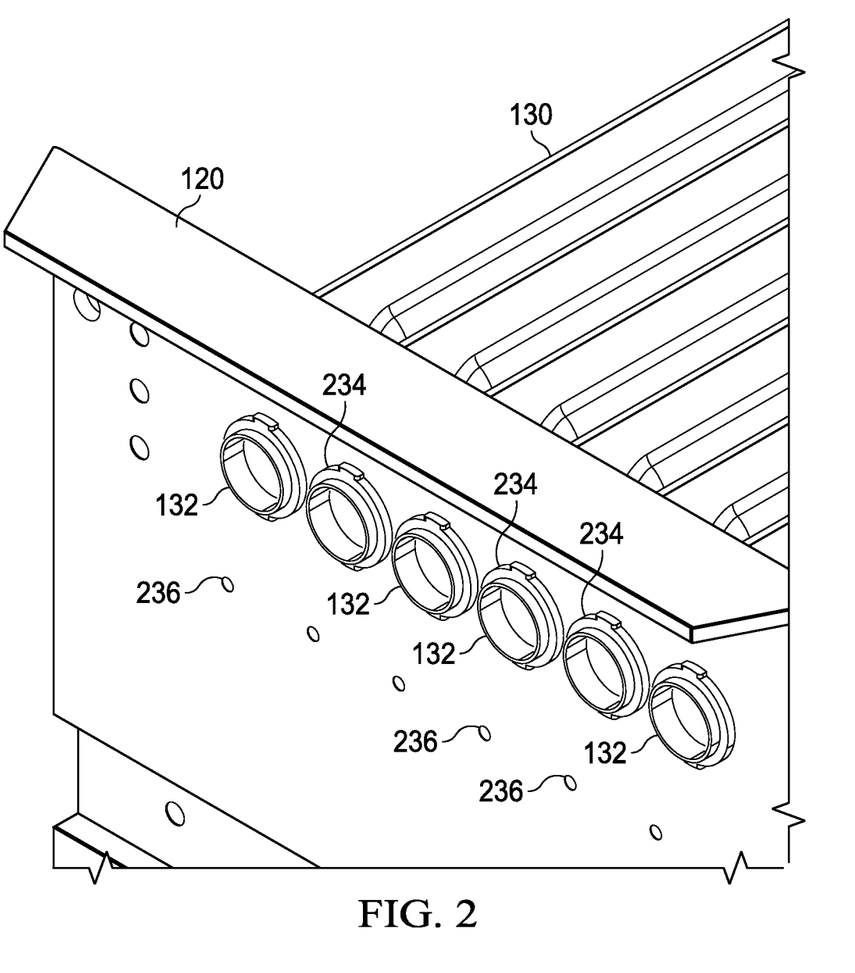
FIG. 2 is an isometric view of inlets of heat exchangers of the furnace of FIG. 1.

FIG. 2 is an isometric view of inlets of the heat exchangers (one referenced as 130) of the furnace of FIG. 1. In the embodiment of FIG. 2, the inlet 132 of the heat exchanger 130 is joined to a faceplate (not separately referenced) of the burner assembly 120. In one embodiment, a crimp 234 joins the inlet 132 to the faceplate, forming a ridge that protrudes slightly forward of the faceplate as shown. A mounting hole 236 is located a predetermined distance and at a predetermined orientation with respect to the inlet 132. The mounting hole 236 is configured to allow a $NO_x$ reduction baffle (not shown) to be mounted in the heat exchanger 130. Corresponding mounting holes allow corresponding $NO_x$ reduction baffles (not shown) to be mounted in the other heat exchangers shown in FIG. 2.

Figure 3:
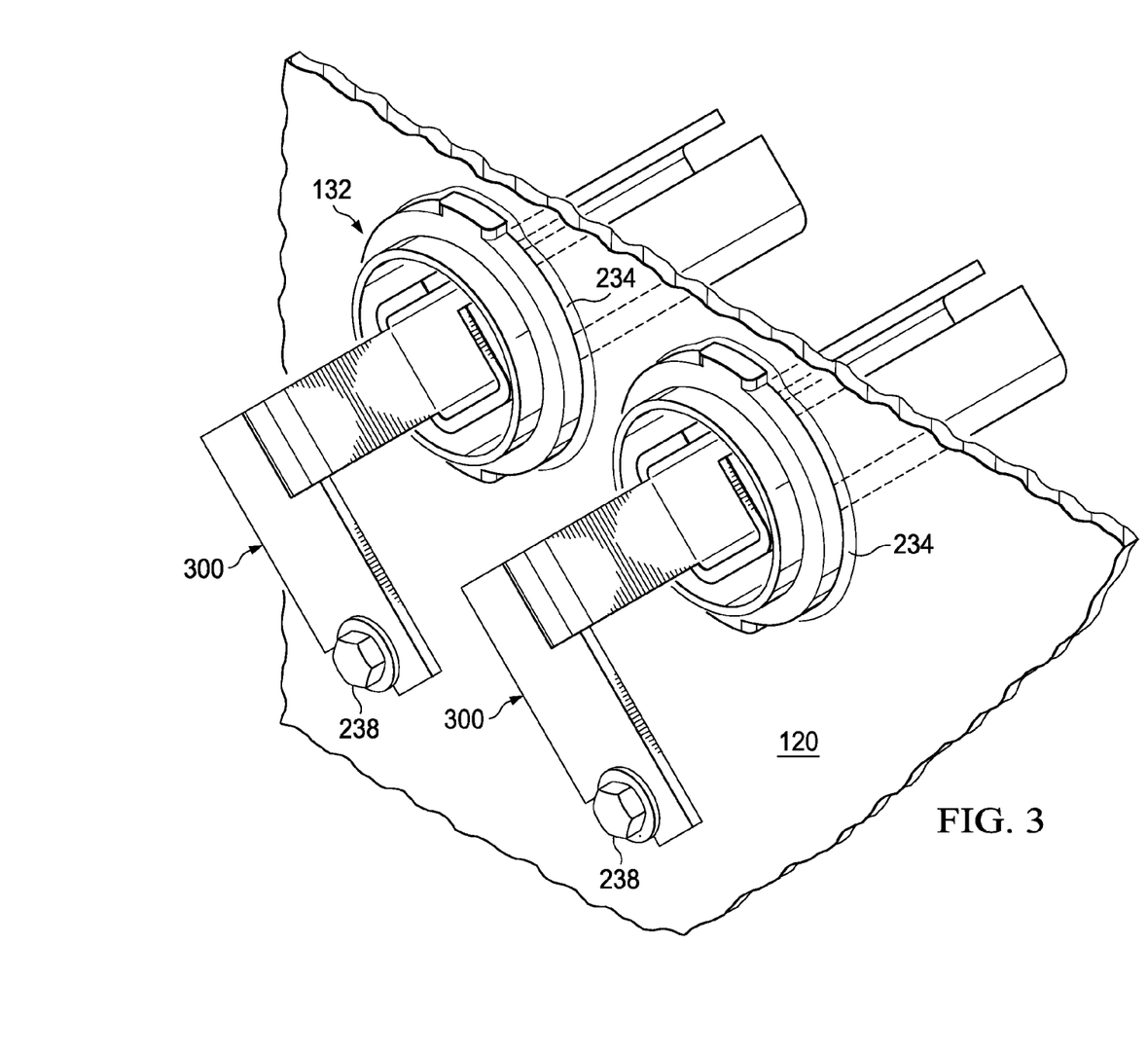
FIG. 3 is an isometric view of a self-locating $NO_x$ reduction baffle having a generally square cross-sectional configuration and associated with an inlet of one of the heat exchangers of FIGS. 1 and 2.

FIG. 3 is an isometric view of a self-locating $NO_x$ reduction baffle 300 having a generally square cross-sectional configuration and associated with an inlet of one of the heat exchangers of FIGS. 1 and 2. In general, the baffle 300 includes a body and a locating structure (both unreferenced in FIG. 3). The body extends into the inlet 132, and the locating structure is coupled to the body, extends axially out of the inlet 132 and then extends radially outward from the inlet 132 where a fastener 238 (e.g., a screw or bolt) attaches the locating structure to the faceplate using the hole 236 of FIG. 2. Alternative embodiments employ other mechanisms, features or structures to attach the baffle 300 to the faceplate.

Figure 4A:
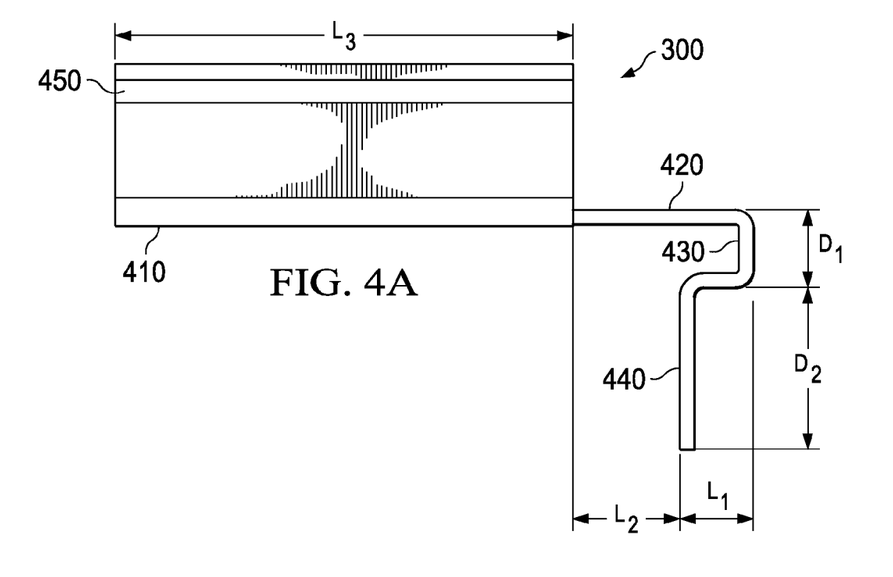
FIGS. 4A-F are various views of the $NO_x$ reduction baffle embodiment of FIG. 3.
Figure 4B:
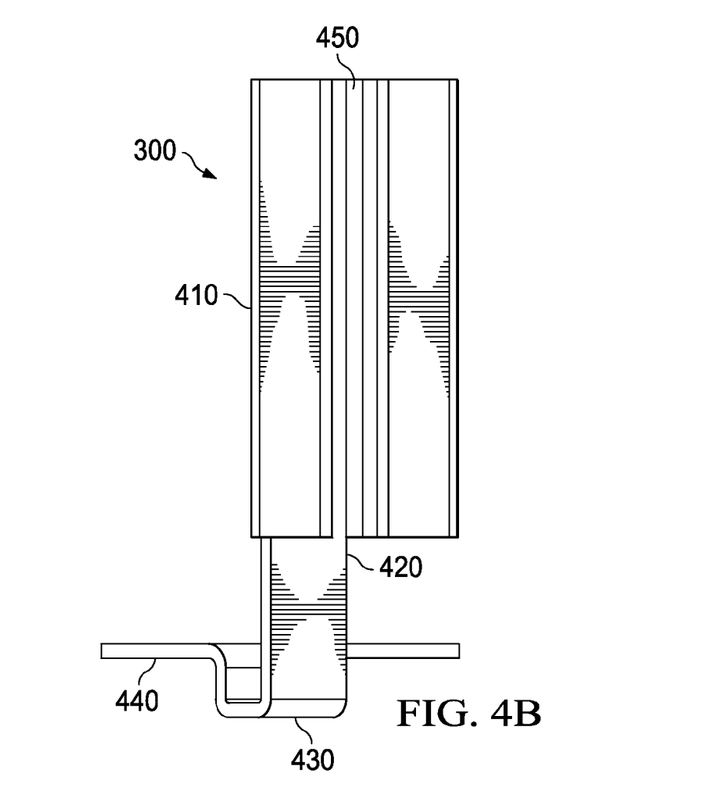
Figure 4C:
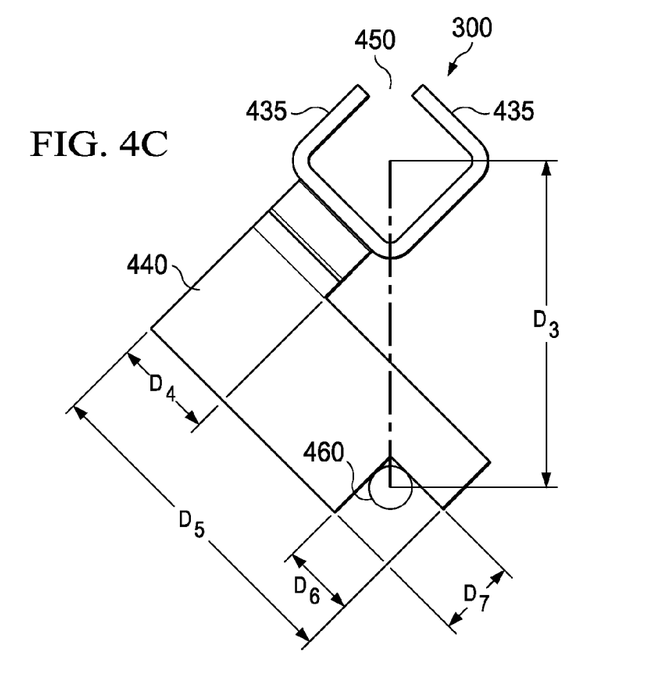
Figure 4D:
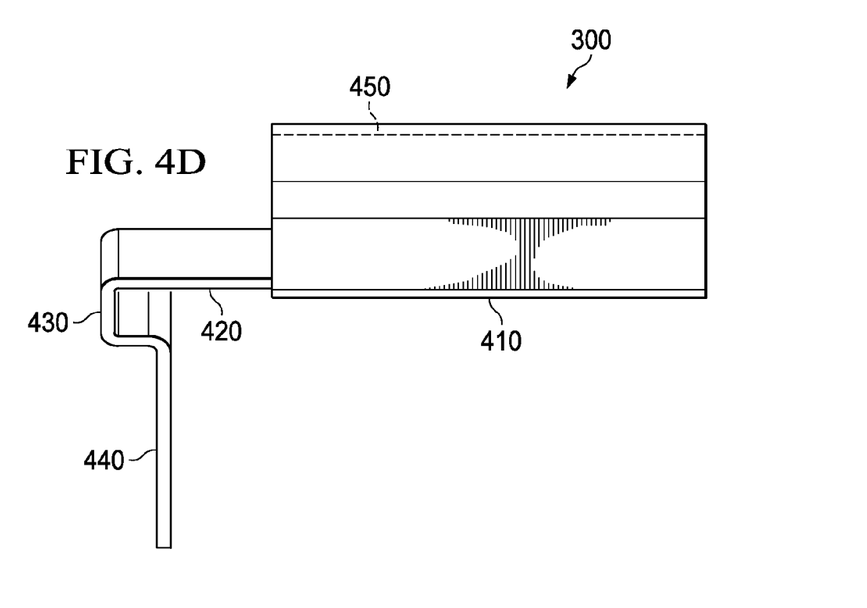
Figure 4E:
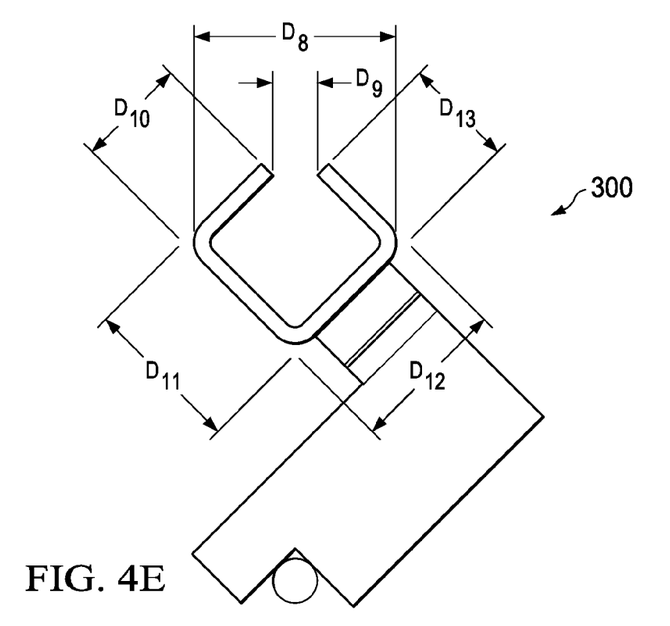
Figure 4F:
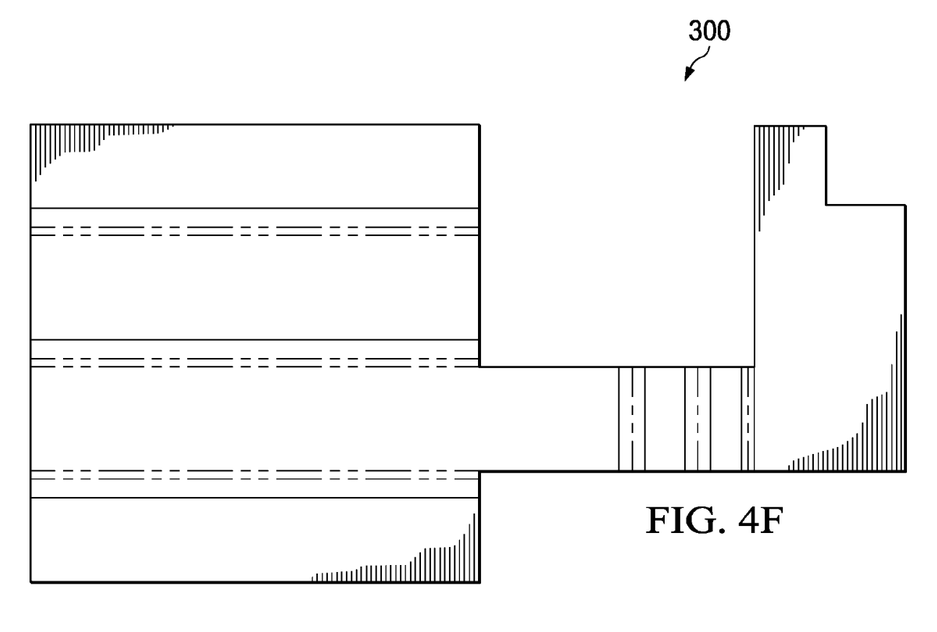

FIGS. 4A-F are various views of the $NO_x$ reduction baffle embodiment 300 (the embodiment having a generally square cross-sectional configuration) of FIG. 3. FIG. 4A is a front-side elevational view; FIG. 4B is a plan view; FIG. 4C is a left-side elevational view; FIG. 4D is an isometric view; FIG. 4E is a right-side elevational view illustrating the cross-sectional configuration of the baffle 300; and FIG. 4F is a view of a flat piece of metal that can be bent to form the baffle 300.

The baffle 300 includes a body 410 having a predetermined length and cross-sectional configuration. The baffle 300 also includes a locating structure. The locating structure includes an insertion portion 420, a crimp-spanning portion 430 and a mounting portion 440. The insertion portion 420 is coupled to the body 410 and configured to place the body 410 in a predetermined longitudinal location within a heat exchanger. The crimp-spanning portion 430 is coupled to the insertion portion 420 and configured to arch over and span the crimp 234 of FIG. 2. The mounting portion 440 is coupled to the crimp-spanning portion 430 and configured to allow the baffle 300 to be attached to another structure (e.g., the faceplate of FIGS. 2 and 3). When the baffle 300 is attached to the other structure, the body 410 becomes located at the predetermined longitudinal location and is laterally constrained within the heat exchanger.

The body 410 also has converging sidewalls 435 that define a longitudinal slot 450 having a predetermined width and position along the predetermined length of the body 410. When the baffle 300 is attached to the other structure, the slot 450 is also oriented relative to the heat exchanger. In the illustrated embodiment, assuming the heat exchanger is properly mounted in the furnace for which it was designed, the slot 450 is oriented such that it is located at or at least near the top of the body 410. In this orientation, normal convection causes a flame traveling through the body 410 to rise toward, and perhaps partially exit, the slot 450.

The mounting portion 440 includes a hole 460 configured to receive a fastener (e.g., a screw or bolt) that may be employed to attach the baffle 300. FIG. 4F illustrates that the embodiment of FIGS. 4A-4F may be constructed of a single piece of metal, perhaps a perforated sheet or metal mesh. In one embodiment, the metal sheet is grade 310 stainless steel. In one embodiment, the metal mesh is Kanthal D®, commercially available from Sandvik AB of Sandviken, Sweden.

As can be seen particularly in FIGS. 4C and 4E, the body 410 has a generally square cross-sectional configuration. A flame (not shown) enters an end of the body 410 proximate the insertion portion 420 and rises toward the slot 450 as it travels toward and eventually exits a distal end of the body 410. The length $L_2$ of the insertion portion 420 is sufficient to allow the flame to develop before entering the body 410. In other words, the flame is not partially quenched before entering the body. This avoids elevated levels of CO production. The flame may at least partially exit the slot 450 depending upon the width thereof.

FIGS. 4A-4E set forth various dimensions of the baffle 300. Table 1, below, gives example dimensions for a specific embodiment of the baffle 300.

TABLE 1

Example Values for the Baffle Embodiment of FIGS. 4A-F

| Variable | Example Value |
|---|---|
| $L_1$ | 0.360" |
| $L_2$ | 0.500" |
| $L_3$ | 2.270" |
| $D_1$ | 0.350" |
| $D_2$ | 0.750" |
| $D_3$ | 1.600" |
| $D_4$ | 0.540" |
| $D_5$ | 1.480" |
| $D_6$ | 0.390" |
| $D_7$ | 0.370" |
| $D_8$ | 0.990" |
| $D_9$ | 0.214" |
| $D_{10}$ | 0.510" |
| $D_{11}$ | 0.740" |
| $D_{12}$ | 0.740" |
| $D_{13}$ | 0.510" |

Those skilled will recognize, however that other embodiments of the baffle 300 have dimensions that differ from the values given in Table 1 in whole or in part.

Figure 5A:
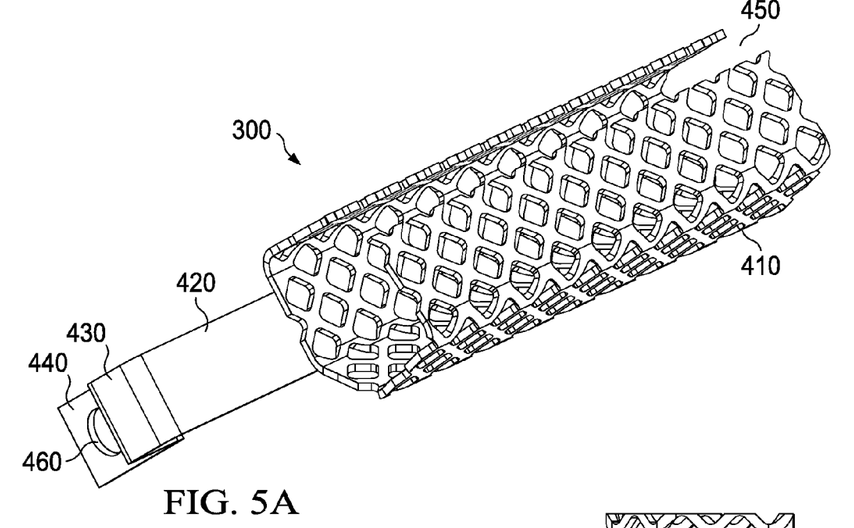
FIGS. 5A-E are various views of a self-locating $NO_x$ reduction baffle having a generally pentagonal cross-sectional configuration that may be associated with the inlet of a heat exchanger.
Figure 5B:
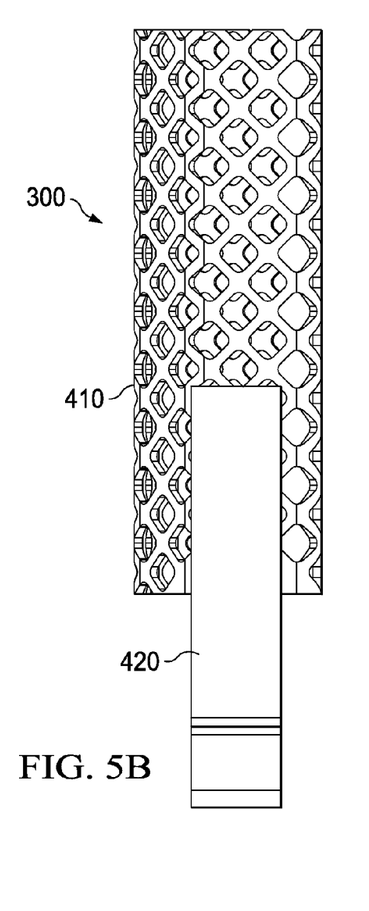
Figure 5C:
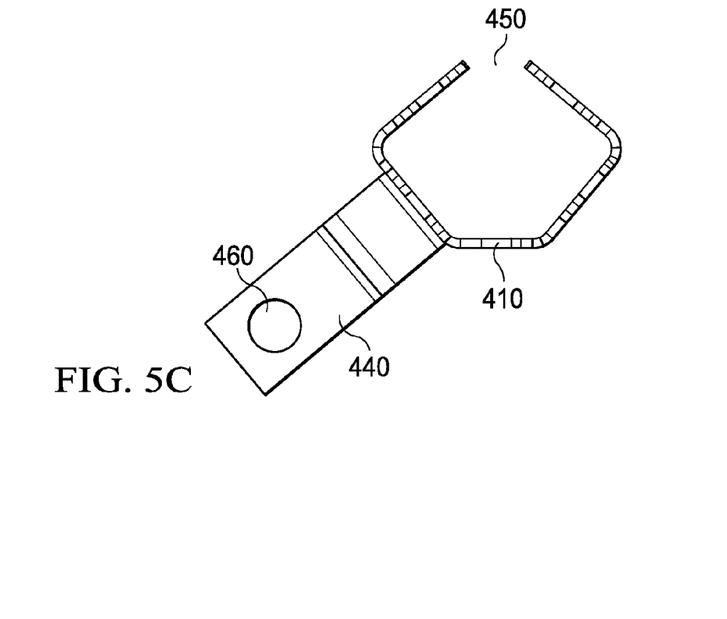
Figure 5D:
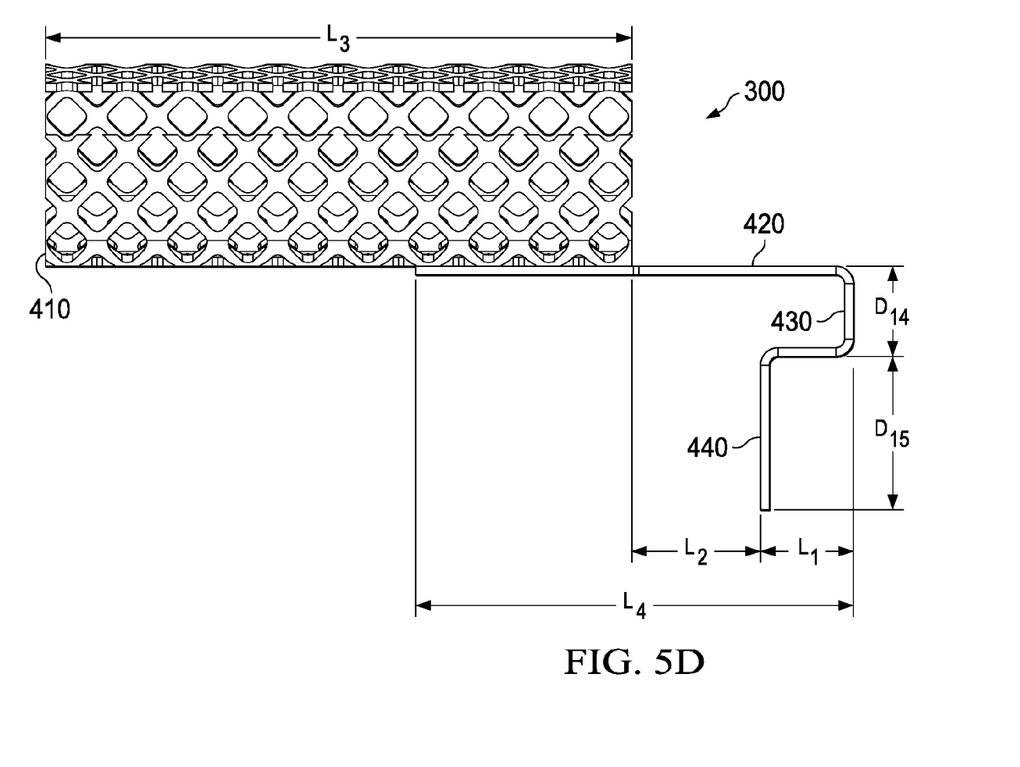
Figure 5E:
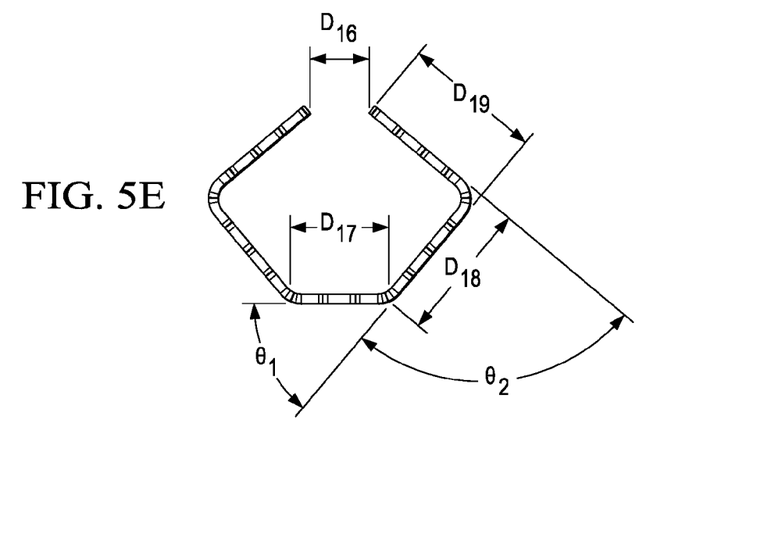

FIGS. 5A-E are various views of a self-locating $NO_x$ reduction baffle having a generally pentagonal cross-sectional configuration that may be associated with the inlet of a heat exchanger. FIG. 5A is an isometric view; FIG. 5B is a plan view; FIG. 5C is a right-side elevational view; FIG. 5D is a front-side elevational view; and FIG. 5E is a partial right-side elevational view illustrating the cross-sectional configuration of the baffle embodiment.

The baffle 300 includes a body 410 having a predetermined length and cross-sectional configuration. The baffle 300 also includes a locating structure. The locating structure includes an insertion portion 420, a crimp-spanning portion 430 and a mounting portion 440. The insertion portion 420 is coupled to the body 410 and configured to place the body 410 in a predetermined longitudinal location within a heat exchanger. The crimp-spanning portion 430 is coupled to the insertion portion 420 and configured to arch over and span the crimp 234 of FIG. 2. The mounting portion 440 is coupled to the crimp-spanning portion 430 and configured to allow the baffle 300 to be attached to another structure (e.g., the faceplate of FIGS. 2 and 3). When the baffle 300 is attached to the other structure, the body 410 becomes located at the predetermined longitudinal location and is laterally constrained within the heat exchanger.

The body 410 also has a longitudinal slot 450 having a predetermined width and position. When the baffle 300 is attached to the other structure, the slot 450 is also oriented relative to the heat exchanger. In the illustrated embodiment, assuming the heat exchanger is properly mounted in the furnace for which it was designed, the slot 450 is oriented such that it is located at or at least near the top of the body 410. In this orientation, normal convection causes a flame traveling through the body 410 to rise toward, and perhaps partially exit, the slot 450.

The mounting portion 440 includes a hole 460 configured to receive a fastener (e.g., a screw or bolt) that may be employed to attach the baffle 300. FIG. 4F illustrates that the embodiment of FIGS. 5A-5F may be constructed of two components: (1) the locating structure that forms the insertion portion 420, the crimp-spanning portion 430 and the mounting portion 440 and (2) the body 410 formed of steel mesh and welded or otherwise fused to the locating structure. In one embodiment, the locating structure is a grade 310 stainless steel mesh, and the steel mesh is Kanthal D®.

As can be seen particularly in FIGS. 5C and 5E, the body 410 has a generally pentagonal cross-sectional configuration. A flame (not shown) enters an end of the body 410 proximate the insertion portion 420 and rises toward the slot 450 as it travels toward and eventually exits a distal end of the body 410. The length $L_2$ of the insertion portion 420 is sufficient to allow the flame to develop before entering the body 410. In other words, the flame is not partially quenched before entering the body. This avoids elevated levels of CO production. The flame may at least partially exit the slot 450 depending upon the width thereof.

FIGS. 5A-5E set forth various dimensions of the baffle 300. Table 2, below, gives example dimensions for a specific embodiment of the baffle 300.

TABLE 2

Example Values for the Baffle Embodiment of FIGS. 5A-E

| Variable | Example Value |
|---|---|
| $L_4$ | 1.160" |
| $D_{14}$ | 0.350" |
| $D_{15}$ | 0.560" |
| $D_{16}$ | 0.220" |
| $D_{17}$ | 0.380" |
| $D_{18}$ | 0.510" |
| $D_{19}$ | 0.500" |
| $\theta_1$ | 50° |
| $\theta_2$ | 85° |

Those skilled will recognize, however that other embodiments of the baffle 300 have dimensions that differ from the values given in Table 2 in whole or in part.

Figure 6A:
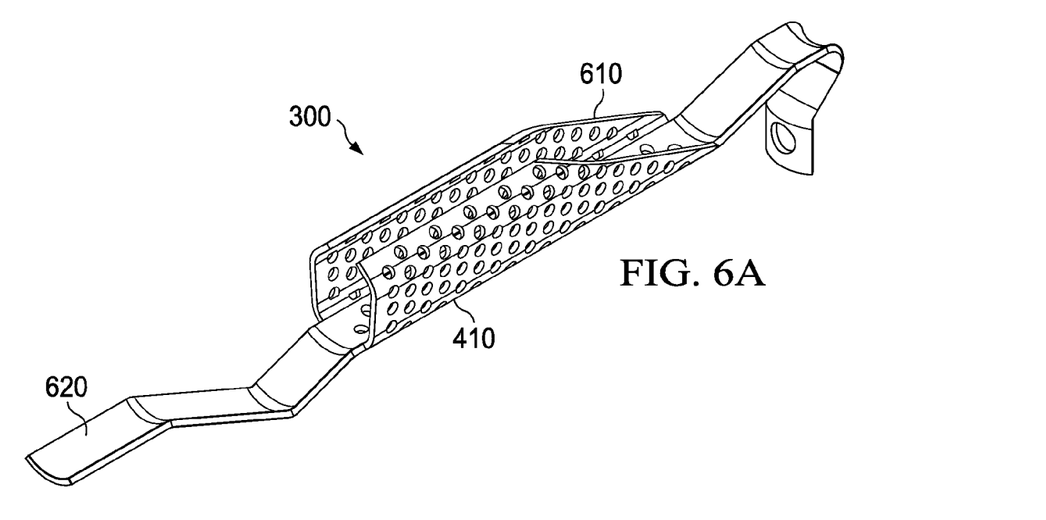
FIGS. 6A-F are various views of a self-locating $NO_x$ reduction baffle having a generally vertically elongated cross-sectional configuration that may be associated with the inlet of a heat exchanger.
Figure 6B:
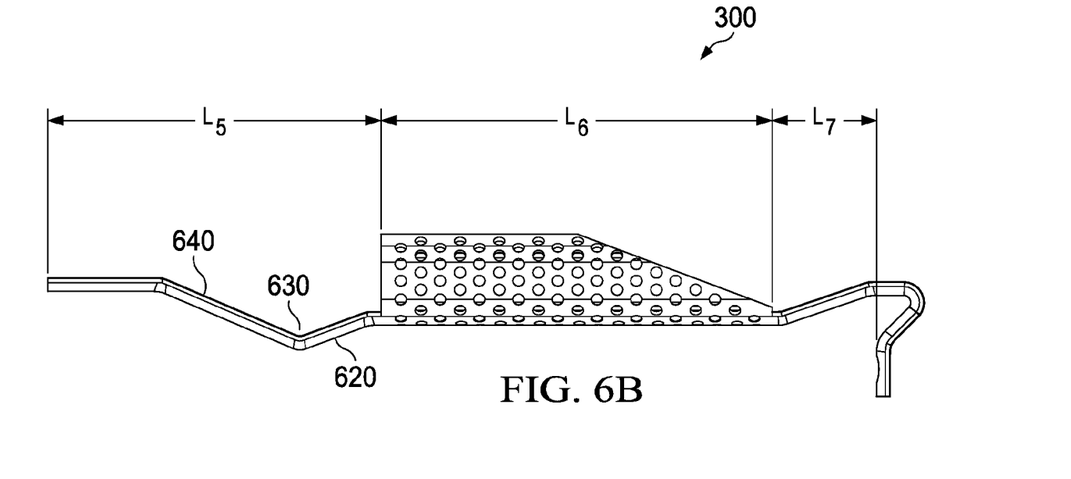
Figure 6C:
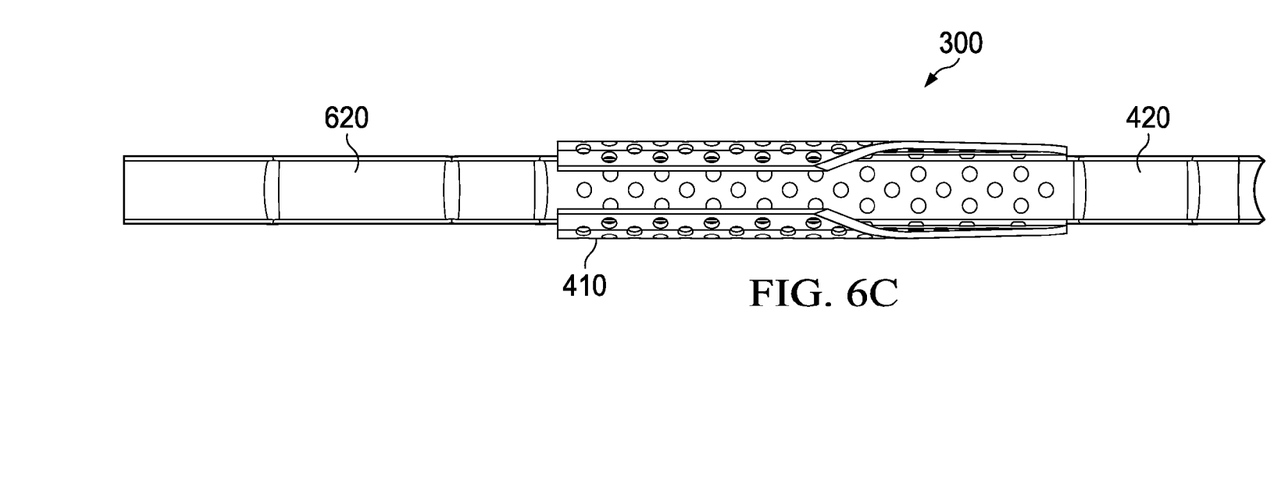
Figure 6D:
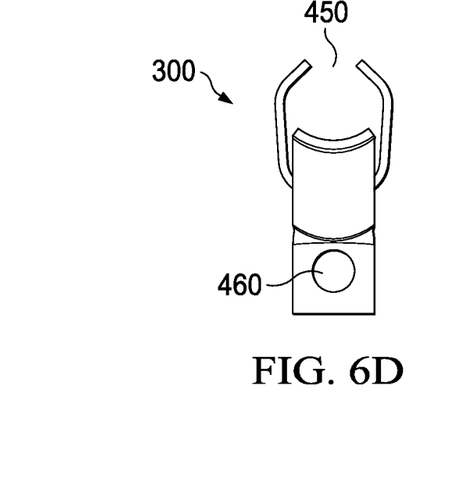
Figure 6E:
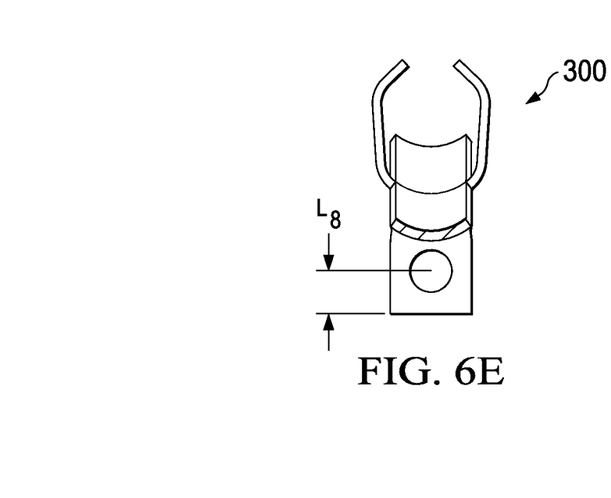
Figure 6F:
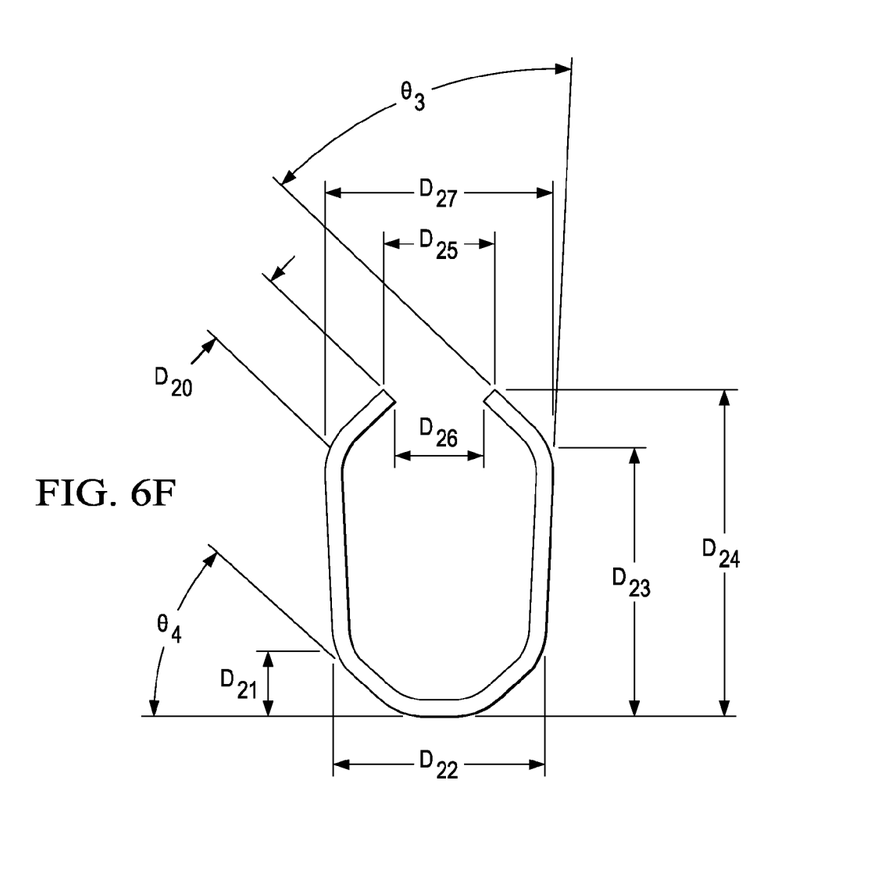

FIGS. 6A-F are various views of a self-locating $NO_x$ reduction baffle having a generally vertically elongated cross-sectional configuration that may be associated with the inlet of a heat exchanger. FIG. 6A is an isometric view; FIG. 6B is a front-side elevational view; FIG. 6C is a plan view; FIG. 6D is a left-side elevational view; FIG. 6E is a right-side elevational view; and FIG. 6F is a diagram illustrating the cross-sectional configuration of the baffle embodiment.

The baffle 300 includes a body 410 having a predetermined length and cross-sectional configuration. The baffle 300 also includes a locating structure. The locating structure includes an insertion portion 420, a crimp-spanning portion 430 and a mounting portion 440. The insertion portion 420 is coupled to the body 410 and configured to place the body 410 in a predetermined longitudinal location within a heat exchanger. The crimp-spanning portion 430 is coupled to the insertion portion 420 and configured to arch over and span the crimp 234 of FIG. 2. The mounting portion 440 is coupled to the crimp-spanning portion 430 and configured to allow the baffle 300 to be attached to another structure (e.g., the faceplate of FIGS. 2 and 3). When the baffle 300 is attached to the other structure, the body 410 becomes located at the predetermined longitudinal location and is laterally constrained within the heat exchanger.

The body 410 also has a longitudinal slot 450 having a predetermined width and position. When the baffle 300 is attached to the other structure, the slot 450 is also oriented relative to the heat exchanger. In the illustrated embodiment, assuming the heat exchanger is properly mounted in the furnace for which it was designed, the slot 450 is oriented such that it is located at or at least near the top of the body 410. In this orientation, normal convection causes a flame traveling through the body 410 to rise toward, and perhaps partially exit, the slot 450.

The mounting portion 440 includes a hole 460 configured to receive a fastener (e.g., a screw or bolt) that may be employed to attach the baffle 300. The embodiment of FIGS. 6A-6F may be constructed of a single piece of metal, perhaps a perforated sheet or metal mesh. In one embodiment, the metal sheet is grade 310 stainless steel. In one embodiment, the metal mesh is Kanthal D®, commercially available from Sandvik AB of Sandviken, Sweden.

As can be seen particularly in FIGS. 6D and 6E, the body 410 has a generally vertically elongated cross-sectional configuration. A flame (not shown) enters an end of the body 410 proximate the insertion portion 420 and rises toward the slot 450 as it travels toward and eventually exits a distal end of the body 410. Unlike the embodiments of FIGS. 4A-4F and 5A-5E, the length $L_7$ of the insertion portion 420 is such that the flame is partially quenched before entering the body 410. The proximal end of the body 410 also features an acutely angled entry 610. This has been found further to reduce $NO_x$ production, e.g., to below 20 ng/J. However, elevated CO levels result from the partial quenching, as noted above. To reduce the CO levels, e.g., to acceptable levels, the embodiment of FIGS. 6A-6F provides a further structure that extends from the body 410 at an end thereof that is distal from the locating structure 420. The further structure includes a leg portion 620, a bend 630 and a reactive portion 640. The leg portions 620 is angled with respect to the body 410 such that the bend 630 contacts the heat exchanger when the baffle 300 is located at its desired position therein, self-locating the baffle 300 in the heat exchanger. The reactive portion 640 is exposed to air flow in the heat exchanger such that its temperature elevates, configuring it to provide a reactive surface adapted to create a reaction with respect to a combustion product (e.g., CO). In a specific embodiment, the reactive surface is adapted to cause CO to be converted into $CO_2$, which as stated above is generally regarded as being less harmful than CO. The flame may at least partially exit the slot 450 depending upon the width thereof.

FIGS. 6A-6F set forth various dimensions of the baffle 300. Table 3, below, gives example dimensions for a specific embodiment of the baffle 300.

TABLE 3

Example Values for the Baffle Embodiment of FIGS. 6A-F

| Variable | Example Value |
|---|---|
| $L_5$ | 3.365" |
| $L_6$ | 3.750" |
| $L_7$ | 1.375" |
| $L_8$ | 0.190" |
| $D_{20}$ | 0.270" |
| $D_{21}$ | 0.148" |
| $D_{22}$ | 0.570" |
| $D_{23}$ | 0.750" |
| $D_{24}$ | 0.930" |
| $D_{25}$ | 0.250" |
| $D_{26}$ | 0.200" |
| $D_{27}$ | 0.640" |
| $\theta_3$ | 52° |
| $\theta_4$ | 35° |

Those skilled will recognize, however that other embodiments of the baffle 300 have dimensions that differ from the values given in Table 3 in whole or in part.

Figure 7A:
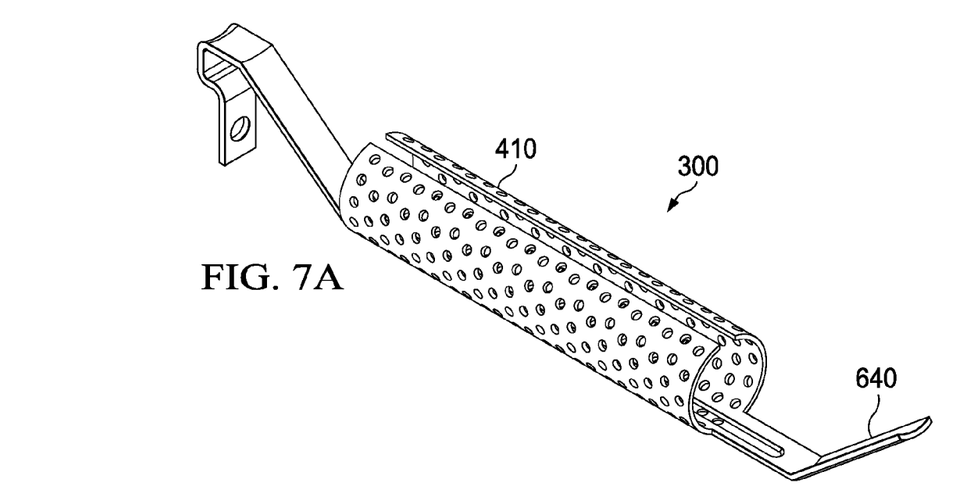
FIGS. 7A-E are various views of a self-locating $NO_x$ reduction baffle having a generally circular cross-sectional configuration that may be associated with the inlet of a heat exchanger.
Figure 7B:
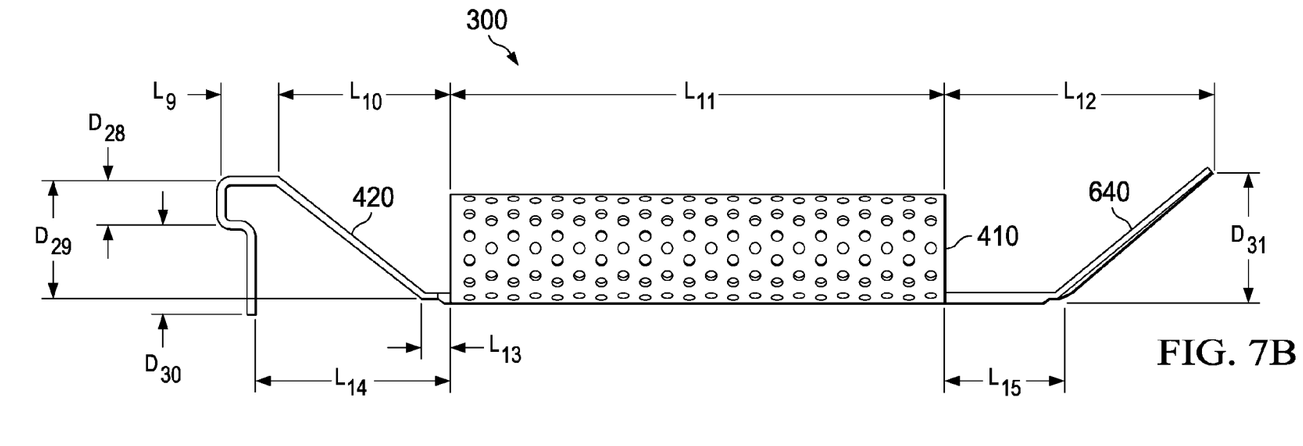
Figure 7C:
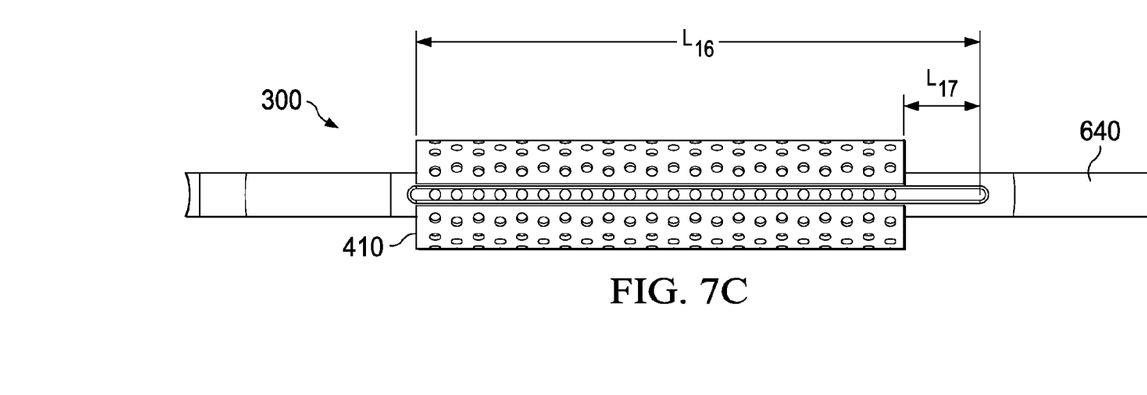
Figure 7D:
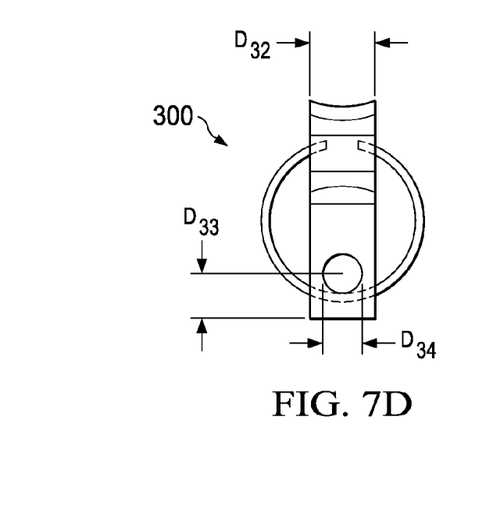
Figure 7E:
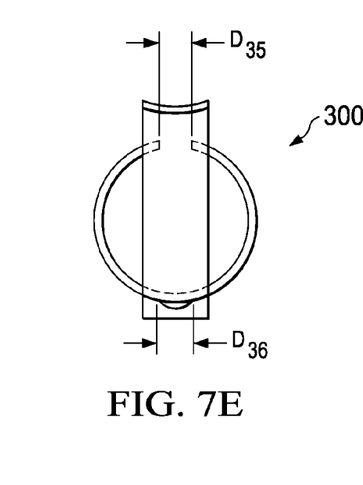

FIGS. 7A-E are various views of a self-locating $NO_x$ reduction baffle having a generally circular cross-sectional configuration that may be associated with the inlet of a heat exchanger. FIG. 7A is an isometric view; FIG. 7B is a front-side elevational view; FIG. 7C is a plan view; FIG. 7D is a left-side elevational view; and FIG. 7E is a right-side elevational view. FIGS. 7E and 7F together illustrate the cross-sectional configuration of the baffle embodiment.

The baffle 300 includes a body 410 having a predetermined length and cross-sectional configuration. The baffle 300 also includes a locating structure. The locating structure includes an insertion portion 420, a crimp-spanning portion 430 and a mounting portion 440. The insertion portion 420 is coupled to the body 410 and configured to place the body 410 in a predetermined longitudinal location within a heat exchanger. The crimp-spanning portion 430 is coupled to the insertion portion 420 and configured to arch over and span the crimp 234 of FIG. 2. The mounting portion 440 is coupled to the crimp-spanning portion 430 and configured to allow the baffle 300 to be attached to another structure (e.g., the faceplate of FIGS. 2 and 3). When the baffle 300 is attached to the other structure, the body 410 becomes located at the predetermined longitudinal location and is laterally constrained within the heat exchanger.

The body 410 also has a longitudinal slot 450 having a predetermined width and position. When the baffle 300 is attached to the other structure, the slot 450 is also oriented relative to the heat exchanger. In the illustrated embodiment, assuming the heat exchanger is properly mounted in the furnace for which it was designed, the slot 450 is oriented such that it is located at or at least near the top of the body 410. In this orientation, normal convection causes a flame traveling through the body 410 to rise toward, and perhaps partially exit, the slot 450.

The mounting portion 440 includes a hole 460 configured to receive a fastener (e.g., a screw or bolt) that may be employed to attach the baffle 300. The embodiment of FIGS. 7A-7E may be constructed of a single piece of metal, perhaps a perforated sheet or metal mesh. In one embodiment, the metal sheet is grade 310 stainless steel. In one embodiment, the metal mesh is Kanthal D®, commercially available from Sandvik AB of Sandviken, Sweden.

As can be seen particularly in FIGS. 7D and 7E, the body 410 has a generally circular cross-sectional configuration. A flame (not shown) enters an end of the body 410 proximate the insertion portion 420 and rises toward the slot 450 as it travels toward and eventually exits a distal end of the body 410. Unlike the embodiments of FIGS. 4A-4F and 5A-5E and like the embodiment of FIGS. 6A-6F, the length $L_7$ of the insertion portion 420 is such that the flame is partially quenched before entering the body 410. However, unlike the embodiment of FIGS. 6A-6F, the proximal end of the body 410 lacks an acutely angled entry. This has also been found to reduce $NO_x$ production, e.g., to below 20 ng/J. However, elevated CO levels result from the partial quenching, as noted above. To reduce the CO levels, e.g., to acceptable levels, the embodiment of FIGS. 7A-7F provides a further structure that extends from the body 410 at an end thereof that is distal from the locating structure 420. It should be noted that the embodiment of FIGS. 7A-7F is not self-locating, therefore the further structure includes only a reactive portion 640. The reactive portion 640 is exposed to air flow in the heat exchanger such that its temperature elevates, configuring it to provide a reactive surface adapted to create a reaction with respect to a combustion product (e.g., CO). In a specific embodiment, the reactive surface is adapted to cause CO to be converted into $CO_2$, which as stated above is generally regarded as being less harmful than CO. The flame may at least partially exit the slot 450 depending upon the width thereof.

FIGS. 7A-7E set forth various dimensions of the baffle 300. Table 4, below, gives example dimensions for a specific embodiment of the baffle 300.

TABLE 4

Example Values for the Baffle Embodiment of FIGS. 7A-E

| Variable | Example Value |
|---|---|
| $L_9$ | 0.416" |
| $L_{10}$ | 1.334" |
| $L_{11}$ | 3.750" |
| $L_{12}$ | 2.020" |
| $L_{13}$ | 0.239" |
| $L_{14}$ | 1.522" |
| $L_{15}$ | 0.882" |
| $L_{16}$ | 4.298" |
| $L_{17}$ | 0.536" |
| $D_{28}$ | 0.310" |
| $D_{29}$ | 0.880" |

TABLE 4-continued

Example Values for the Baffle Embodiment of FIGS. 7A-E

| Variable | Example Value |
|---|---|
| $D_{30}$ | 0.670" |
| $D_{31}$ | 0.970" |
| $D_{32}$ | 0.375" |
| $D_{33}$ | 0.250" |
| $D_{34}$ | 0.188" |
| $D_{35}$ | 0.215" |
| $D_{36}$ | 0.184" |

Those skilled will recognize, however that other embodiments of the baffle 300 have dimensions that differ from the values given in Table 4 in whole or in part.

Those skilled in the art to which this application relates will appreciate that other and further additions, deletions, substitutions and modifications may be made to the described embodiments.

What is claimed is:

1. A nitrogen oxide reduction baffle for a heat exchanger of a furnace, comprising:
    a body having a predetermined length, cross-sectional configuration and converging sidewalls, said converging sidewalls defining a longitudinal slot having a predetermined width and position along said predetermined length; and
    a locating structure coupled to said body and configured to place said body in a predetermined longitudinal location within said heat exchanger and orient said slot relative to said heat exchanger, said body laterally constrained within said heat exchanger when said body is located at said predetermined longitudinal location.

2. The baffle as recited in claim 1 wherein said cross-sectional configuration is adapted for said heat exchanger, said cross-sectional configuration is configured to constrain said body laterally within said heat exchanger when said body is located at said predetermined longitudinal location.

3. The baffle as recited in claim 1 further comprising a further structure extending from said body at an end thereof distal from said locating structure.

4. The baffle as recited in claim 3 wherein said further structure is configured to constrain said body laterally within said heat exchanger when said body is located at said predetermined longitudinal location.

5. The baffle as recited in claim 3 wherein said further structure is configured to provide a reactive surface adapted to create a reaction with respect to a combustion product.

6. The baffle as recited in claim 3 wherein said further structure is configured to constrain said body laterally within said heat exchanger when said body is located at said predetermined longitudinal location and provide a reactive surface adapted to create a reaction with respect to a combustion product.

7. The baffle as recited in claim 1 wherein said cross-sectional configuration is selected from the group consisting of:
    generally square,
    generally pentagonal,
    generally vertically elongated, and
    generally circular.

8. The baffle as recited in claim 1 wherein said body has an acute entry side.

9. The baffle as recited in claim 1 wherein said predetermined length of said body is between about 2.270 inches and about 3.750 inches.

10. The baffle as recited in claim 1 wherein said body is formed of a steel mesh.

11. The baffle as recited in claim 1 wherein said body is formed of perforated steel.

12. The baffle as recited in claim 1 wherein said predetermined width of said slot is between about 0.200 inches and about 0.220 inches.

13. The baffle as recited in claim 1 wherein said slot extends along an entirety of a length of said converging sidewalls of said body.

14. A gas furnace, comprising:
a housing;
a solenoid valve located in said housing;
a manifold coupled to said valve;
at least one gas orifice coupled to said manifold;
at least one corresponding heat exchanger located proximate said at least one gas orifice;
a nitrogen oxide reduction baffle, including:
a body having a predetermined length, cross-sectional configuration and converging sidewalls, said converging sidewalls defining a longitudinal slot having a predetermined width and position along said predetermined length, and
a locating structure coupled to said body and configured to place said body in a predetermined longitudinal location within said at least one corresponding heat exchanger and orient said slot relative to said heat exchanger, said body laterally constrained within said heat exchanger; and
a blower located in said housing proximate said at least one heat exchanger.

15. The gas furnace as recited in claim 14 wherein said cross-sectional configuration is adapted for said at least one corresponding heat exchanger, said cross-sectional configuration is configured to constrain said body laterally within said at least one corresponding heat exchanger when said body is located at said predetermined longitudinal location.

16. The gas furnace as recited in claim 14 further comprising a further structure extending from said body at an end thereof distal from said locating structure.

17. The gas furnace as recited in claim 16 wherein said further structure is configured to constrain said body laterally within said at least one corresponding heat exchanger when said body is located at said predetermined longitudinal location.

18. The gas furnace as recited in claim 16 wherein said further structure is configured to provide a reactive surface adapted to create a reaction with respect to a combustion product.

19. The gas furnace as recited in claim 14 wherein said cross-sectional configuration is selected from the group consisting of:
generally square,
generally pentagonal,
generally vertically elongated, and
generally circular.

20. The gas furnace as recited in claim 14 wherein said body has an acute entry side.

* * * * *